(12) United States Patent
Gatewood

(10) Patent No.: US 11,854,364 B1
(45) Date of Patent: Dec. 26, 2023

(54) EMERGENCY COMMUNICATION ASSEMBLY

(71) Applicant: Richard Gatewood, Magnolia, TX (US)

(72) Inventor: Richard Gatewood, Magnolia, TX (US)

( * ) Notice: Subject to any disclaimer, the term of this patent is extended or adjusted under 35 U.S.C. 154(b) by 0 days.

(21) Appl. No.: 17/902,518

(22) Filed: Sep. 2, 2022

(51) Int. Cl.
*G08B 21/22* (2006.01)
*G08B 21/02* (2006.01)
*H04W 4/90* (2018.01)

(52) U.S. Cl.
CPC ............... *G08B 21/02* (2013.01); *H04W 4/90* (2018.02)

(58) Field of Classification Search
USPC ....... 340/573.1, 526, 522, 523, 524, 539.24, 340/539.12, 691.3, 825.19, 7.5, 7.59, 340/286.07
See application file for complete search history.

(56) References Cited

U.S. PATENT DOCUMENTS

| | | |
|---|---|---|
| 5,086,391 A | 2/1992 | Chambers |
| D536,632 S | 2/2007 | Yuen |
| 8,009,021 B1 | 8/2011 | Peters, Jr. |
| 2004/0086092 A1* | 5/2004 | Fehr ........................ H04M 11/04 379/37 |
| 2007/0229286 A1 | 10/2007 | Huang |
| 2008/0231234 A1 | 9/2008 | Mah |
| 2012/0190386 A1* | 7/2012 | Anderson ............... G01S 19/14 455/456.3 |
| 2013/0278399 A1* | 10/2013 | Graniewitz ........ G06K 7/10366 340/286.06 |
| 2023/0252884 A1* | 8/2023 | Platt ................... G08B 21/0446 340/506 |

FOREIGN PATENT DOCUMENTS

WO    WO2013162754    10/2013

* cited by examiner

*Primary Examiner* — Daniel Previl

(57) ABSTRACT

An emergency communication assembly includes a housing that is positioned in a pre-determined area such that the housing is accessible to a physically limited user in an emergency. A communication unit is integrated into the housing and the communication unit sequentially calls each of a plurality of emergency contact numbers when the communication unit is actuated until one of the emergency contact numbers answers. In this way the communication unit facilitates the physically limited user to communicate with an individual when the physically limited user is experiencing an emergency. A pull string extends outwardly from the housing and the communication unit is turned on when the pull string is pulled by the physically limited user.

8 Claims, 4 Drawing Sheets

EMERGENCY COMMUNICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

The disclosure relates to emergency communication devices and more particularly pertains to a new emergency communication device for facilitating a physically limited user to request emergency assistance. The device includes a communication unit that is positioned in an easily accessible area and a pull string that is attached to the communication unit. The communication unit begins calling each of a plurality of emergency contact numbers until one of the emergency contact numbers answers the call. Additionally, the communication unit includes an emergency button and the communication unit calls 911 when the emergency button is depressed.

(2) Description of Related Art Including Information Disclosed Under 37 CFR 1.97 and 1.98.

The prior art relates to emergency communication devices including an emergency alert device that includes a pendant worn around a user's neck and a personal computer that receives an emergency request from the pendant. The prior art discloses a signaling device that is in communication with a hospital communication network and which broadcasts either an emergency distress call or a non-emergency distress call and which includes a pull cord. The prior art discloses a telephony device for facilitating a resident of an assisted living facility to call a front desk of the assisted living facility. The prior art discloses a fall-over alert device that includes a fall detection unit which broadcasts an alert to a receiver unit when the fall detection unit detects that a user has fallen. The prior art discloses a light emitting device that has a pull cord for actuation. The prior art discloses an emergency alert device that includes a RFID reader which broadcasts an alert to a central system which includes patient specific information that is read from a RFID tag. The prior art discloses an ornamental design for a safety light that includes a bean shaped housing, a light emitter and a pull string.

BRIEF SUMMARY OF THE INVENTION

An embodiment of the disclosure meets the needs presented above by generally comprising a housing that is positioned in a pre-determined area such that the housing is accessible to a physically limited user in an emergency. A communication unit is integrated into the housing and the communication unit sequentially calls each of a plurality of emergency contact numbers when the communication unit is actuated until one of the emergency contact numbers answers. In this way the communication unit facilitates the physically limited user to communicate with an individual when the physically limited user is experiencing an emergency. A pull string extends outwardly from the housing and the communication unit is turned on when the pull string is pulled by the physically limited user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
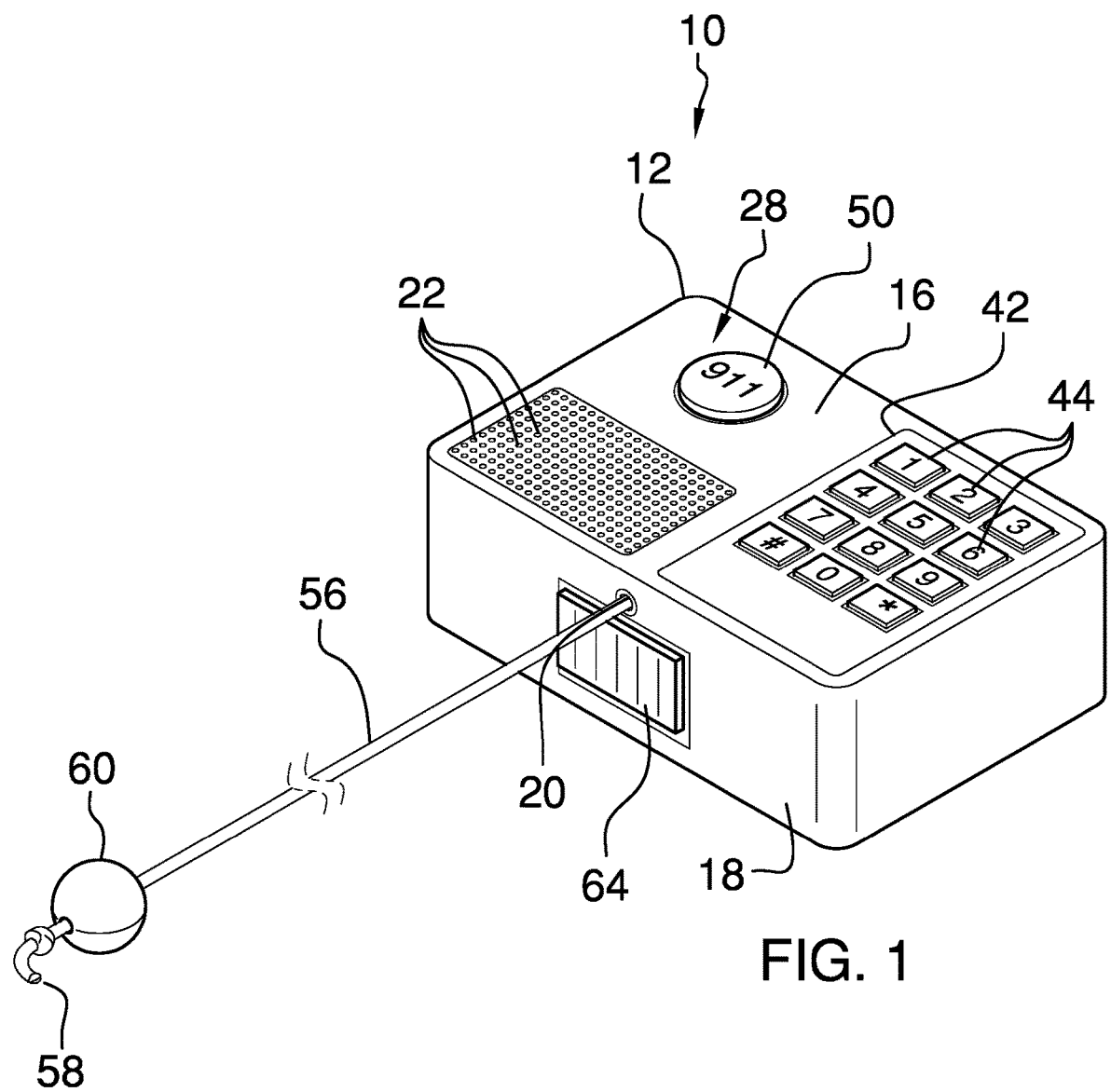
FIG. 1 is a top perspective view of an emergency communication assembly according to an embodiment of the disclosure.
Figure 2:
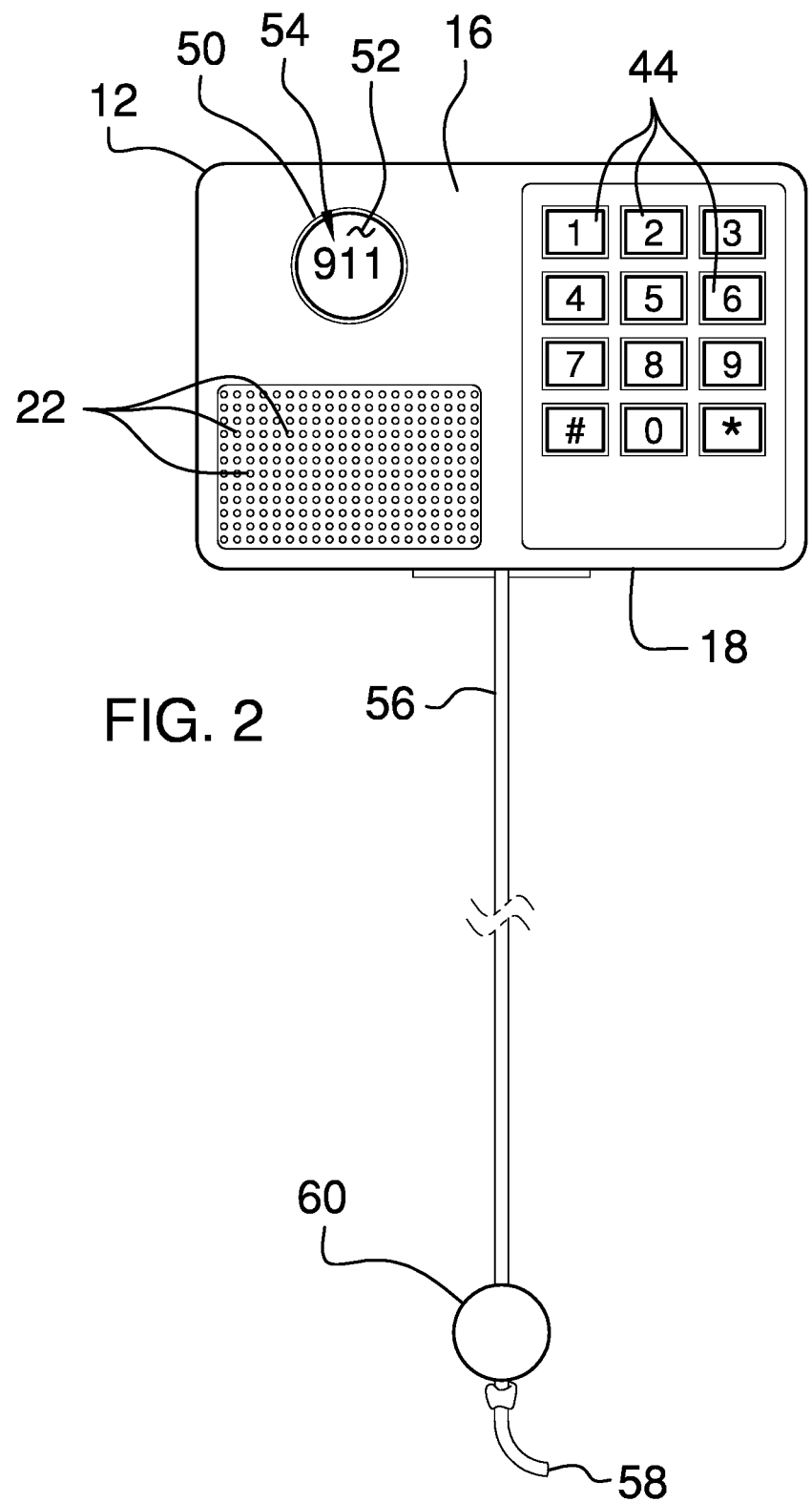
FIG. 2 is a top view of an embodiment of the disclosure.
Figure 3:
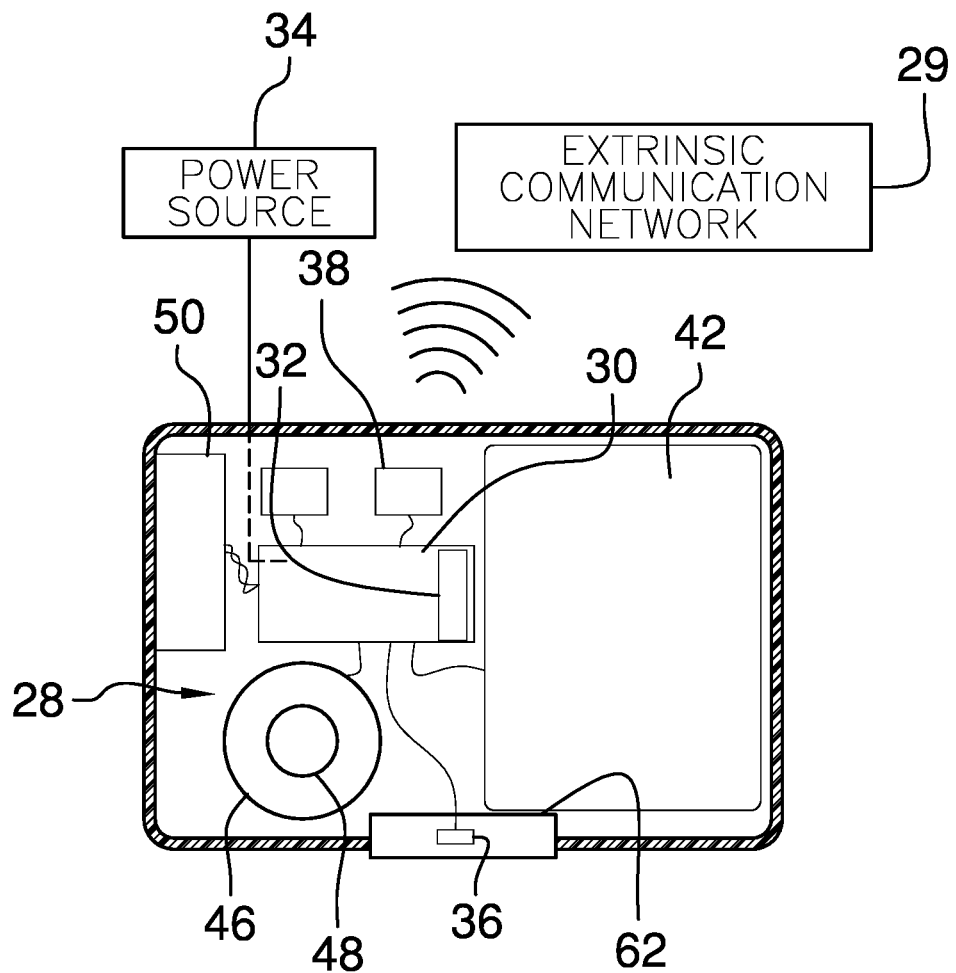
FIG. 3 is a top cut-away view of an embodiment of the disclosure.
Figure 4:
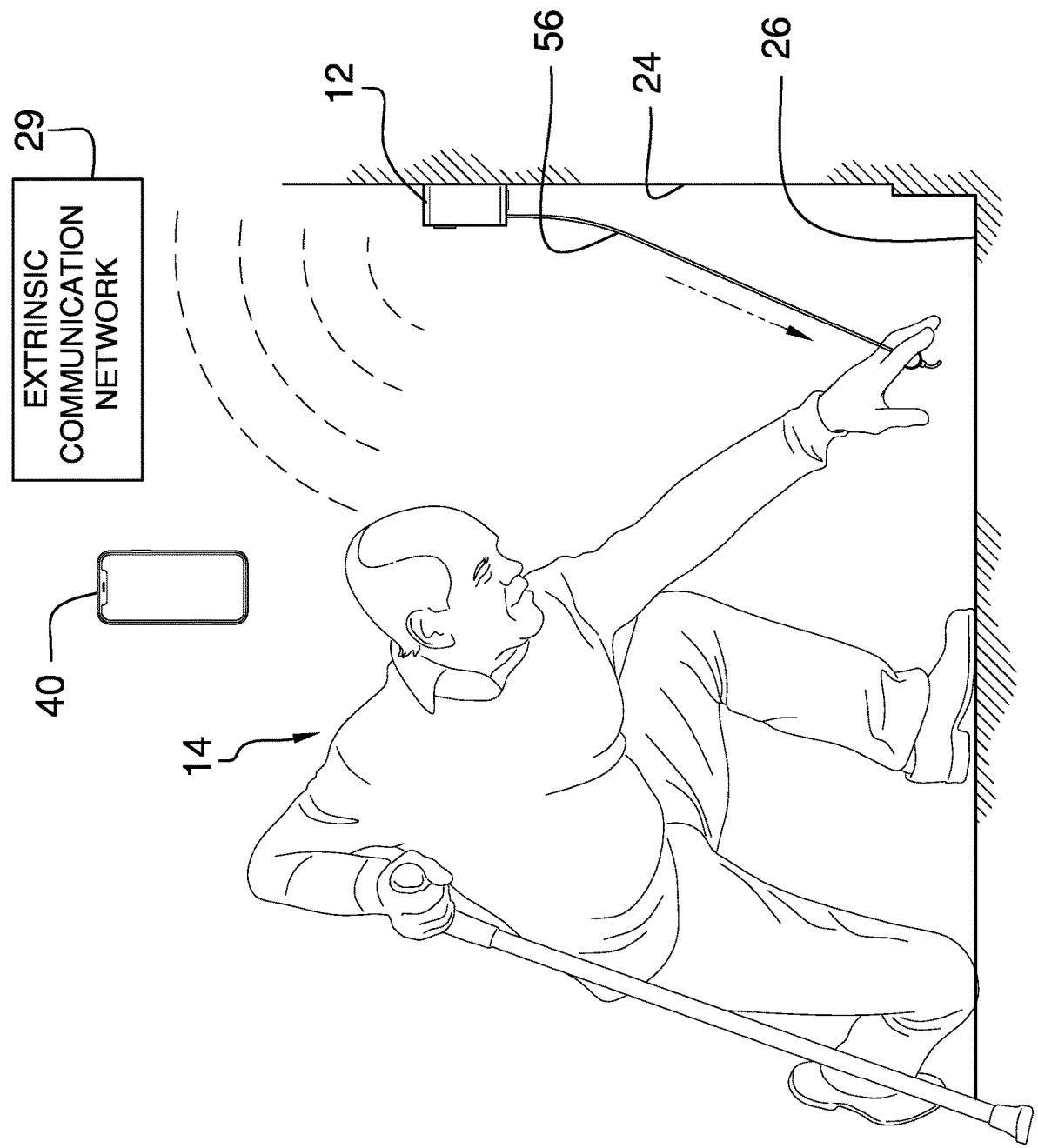
FIG. 4 is a perspective in-use view of an embodiment of the disclosure.

With reference now to the drawings, and in particular to FIGS. 1 through 4 thereof, a new emergency communication device embodying the principles and concepts of an embodiment of the disclosure and generally designated by the reference numeral 10 will be described.

As best illustrated in FIGS. 1 through 4, the emergency communication assembly 10 generally comprises a housing 12 that is positioned in a pre-determined area such that the housing 12 is accessible to a physically limited user 14 in an emergency. The pre-determined area may be a bedroom in a house in which the physically limited user 14 sleeps and the physically limited user 14 may be an elderly person or other person that has limited mobility. The housing 12 has a top wall 16 and a front wall 18; the front wall 18 has an aperture 20 extending into an interior of the housing 12 and the top wall 16 has a plurality of speaker holes 22 each extending into the interior of the housing 12. As is most clearly shown in FIG. 4, the housing 12 may be mounted to a vertical support surface 24, such as a wall of the bedroom, and the housing 12 may be placed near a floor 26 of the bedroom such that the physically limited user 14 can access the housing 12 when the physically limited user 14 has fallen down.

A communication unit 28 is integrated into the housing 12 and the communication unit 28 is in wireless communication with an extrinsic communication network 29. The extrinsic communication network 29 may be the internet, a cellular phone network or other type of wireless communication network. The communication unit 28 is programmed with a plurality of emergency contact phone numbers and the communication unit 28 sequentially calls each of the emergency contact numbers when the communication unit 28 is actuated until one of the emergency contact numbers answers. In this way the communication unit 28 facilitates the physically limited user 14 to communicate with an individual when the physically limited user 14 is experiencing an emergency.

The communication unit 28 comprises a control circuit 30 that is integrated into the housing 12. The control circuit 30 receives a contact input and the control circuit 30 receives an emergency input. The control circuit 30 includes an electronic memory 32 and the electronic memory 32 stores a database comprising the plurality of emergency contact numbers. The electronic memory 32 may comprise random access memory or other type of digital data storage. The control circuit 30 is electrically coupled to a power source 34 comprising an electrical system of the pre-determined area in which the housing 12 is positioned. The communication unit 28 includes a switch 36 that is integrated into the housing 12. The switch 36 is electrically coupled to the control circuit 30 and the control circuit 30 receives the contact input when the switch 36 is turned on.

The communication unit 28 includes a transceiver 38 that is integrated into the housing 12 and the transceiver 38 is electrically coupled to the control circuit 30. The transceiver 38 is in wireless communication with the extrinsic communication network 29 and the transceiver 38 is turned on when the control circuit 30 receives the contact input. Furthermore, the transceiver 38 contacting sequentially contacts each of the emergency contacts in the database stored in the electronic memory 32 until one of the emergency contacts answers when the control circuit 30 receives the contact input. The transceiver 38 contacts local emergency responders when the control circuit 30 receives the emergency input. Additionally, the transceiver 38 is in wireless communication with a personal electronic device 40 thereby facilitating the transceiver 38 to receive phone numbers of the emergency contacts from the personal electronic device 40 to download the phone numbers of the emergency contacts into the electronic memory 32. The personal electronic device 40 may be a smart phone or other type of electronic device that is employed for making phone calls. The transceiver 38 may comprise a radio frequency transceiver or the like and the transceiver 38 may employ Bluetooth communication protocols to communicate with the personal electronic device 40.

The communication unit 28 includes a keypad 42 that is integrated into the top wall 16 of the housing 12 such that the keypad 42 is accessible to the physically limited user 14. The keypad 42 is electrically coupled to the control circuit 30 and the keypad 42 comprises a plurality of numeric keys 44 thereby facilitating the plurality of numeric keys 44 to program phone numbers of the emergency contacts into the electronic memory 32. The communication unit 28 includes a speaker 46 integrated into the housing 12 and the speaker 46 is aligned with the plurality of speaker holes 22 in the top wall 16 of the housing 12 to emit audible sounds outwardly through the speaker holes 22. The speaker 46 is electrically coupled to the control circuit 30 thereby facilitating the speaker 46 to emit words spoken by the emergency contact that answers or the emergency responders. In this way the physically limited user 14 can hear words spoken by the emergency contact that answers or the emergency responders.

The communication unit 28 includes a microphone 48 that is integrated into the housing 12 thereby facilitating the microphone 48 to sense audible sounds. The microphone 48 is electrically coupled to the control circuit 30 thereby facilitating the physically limited user 14 to speak with the emergency contact that answers or the emergency responder. In this way the microphone 48 facilitates the physically limited user 14 to ask the emergency contact that answers or the emergency responders for assistance. The communication unit 28 includes an actuate button 50 that is movably integrated into the top wall 16 of the housing 12. The actuate button 50 is electrically coupled to the control circuit 30 and the control circuit 30 receives the emergency contact when the actuate button 50 is depressed. The actuate button 50 has a top surface 52, the top surface 52 has indicia 54 applied thereon and the indicia 54 comprise the numbers "911".

A pull string 56 extends outwardly from the housing 12 thereby facilitating the pull string 56 to be accessible to the physically limited user 14. The pull string 56 is operationally coupled to the communication unit 28 and the communication unit 28 is turned on when the pull string 56 is pulled by the physically limited user 14. The pull string 56 extends outwardly through the aperture 20 in the front wall 18 of the housing 12 and the pull string 56 is attached to the switch 36. The switch 36 is turned on when the pull string 56 is pulled and the pull string 56 has a distal end 58 with respect to the housing 12. A ball 60 is disposed on the pull string 56 thereby facilitating the physically limited user 14 to grip the ball 60 and the ball 60 is positioned adjacent to the distal end 58 of the pull string 56.

A light emitter 62 is disposed on the front wall 18 of the housing 12 to emit light outwardly from the front wall 18. The light emitter 62 is electrically coupled to the control circuit 30 and the light emitter 62 is turned on when the control circuit 30 receives the contact input or the emergency input. The light emitter 62 may include a lens 64 that is integrated into the front wall 18 of the housing 12 and the light emitter 62 may comprise a light emitting diode or other type of electronic light emitter.

In use, the emergency contact numbers are programmed into the electronic memory 32 with the keypad 42 or the emergency contact numbers can be downloaded from the personal electronic device 40. The physically limited user 14 pulls the pull string 56 when the physically limited user 14 experiences an emergency and the transceiver 38 begins attempting to contact each of the emergency contact numbers until one of the emergency contact numbers answers the call. In this way the physically limited user 14 can speak with the emergency contact that answers the call to ask for help. The physically limited user 14 can depress the actuate button 50 on the housing 12 to call 911 directly in lieu of pulling the pull string 56 or in the event that none of the emergency contacts is able to answer the call.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency communication assembly for contacting a pre-determined emergency contact when a pull string is engaged, said assembly comprising:
   a housing being positioned in a pre-determined area such that said housing is accessible to a physically limited user wherein said housing is configured to be accessible to the physically limited user in an emergency;
   a communication unit being integrated into said housing, said communication unit being in wireless communication with an extrinsic communication network, said communication unit being programmed with a plurality of emergency contact phone numbers, said communication unit sequentially calling each of said emergency contact numbers when said communication unit is actuated until one of said emergency contact numbers answers wherein said communication unit is configured to facilitate the physically limited user to communicate with an individual when the physically limited user is experiencing an emergency; and
   a pull string extending outwardly from said housing thereby facilitating said pull string to be accessible to the physically limited user, said pull string being operationally coupled to said communication unit, said communication unit being turned on when said pull string is pulled by the physically limited user.

2. The assembly according to claim 1, wherein said communication unit comprises:
   a control circuit being integrated into said housing, said control circuit receiving a contact input, said control circuit receiving an emergency input, said control circuit including an electronic memory, said electronic memory storing a database comprising said plurality of emergency contact numbers, said control circuit being electrically coupled to a power source comprising an electrical system of the pre-determined area in which said housing is positioned; and
   a transceiver being integrated into said housing, said transceiver being electrically coupled to said control circuit, said transceiver being in wireless communication with the extrinsic communication network, said transceiver being turned on when said control circuit receives said contact input, said transceiver contacting sequentially contacting each of said emergency contacts in said database stored in said electronic memory until one of said emergency contacts answers when said control circuit receives said contact input, said transceiver contacting local emergency responders when said control circuit receives said emergency input, said transceiver being in wireless communication with a personal electronic device thereby facilitating said transceiver to receive phone numbers of said emergency contacts from the personal electronic device to download the phone numbers of said emergency contacts into said electronic memory.

3. The assembly according to claim 2, wherein said communication unit includes a keypad being integrated into said top wall of said housing such that said keypad is accessible to the physically limited user, said keypad being electrically coupled to said control circuit, said keypad comprising a plurality of numeric keys thereby facilitating said plurality of numeric keys to program phone numbers of said emergency contacts into said electronic memory.

4. The assembly according to claim 2, wherein:
   said housing has a top wall and a front wall, said top wall having a plurality of speaker holes each extending into said interior of said housing;
   said communication unit includes:
      a speaker being integrated into said housing, said speaker being aligned with said plurality of speaker holes in said top wall of said housing wherein said speaker is configured to emit audible sounds outwardly through said speaker holes, said speaker being electrically coupled to said control circuit thereby facilitating said speaker to emit words spoken by said emergency contact that answers or the emergency responders wherein said speaker is configured to facilitate the physically limited user to hear words spoken by said emergency contact that answers or the emergency responders; and
      a microphone being integrated into said housing thereby facilitating said microphone to sense audible sounds, said microphone being electrically coupled to said control circuit thereby facilitating the physically limited user to speak with said emergency contact that answers or the emergency responder wherein said microphone is configured to facilitate the physically limited user to ask said emergency contact that answers or the emergency responders for assistance.

5. The assembly according to claim 2, wherein said communication unit includes an actuate button being movably integrated into a top wall of said housing, said actuate button being electrically coupled to said control circuit, said control circuit receiving said emergency contact when said actuate button is depressed, said actuate button having a top surface, said top surface having indicia being applied thereon, said indicia comprising the numbers "911".

6. The assembly according to claim 2, wherein:
   said housing has a front wall, said front wall having an aperture extending into an interior of said housing;
   said communication unit includes a switch being integrated into said housing, said switch being electrically coupled to said control circuit, said control circuit receiving said contact input when said switch is turned on;
   said pull string extends outwardly through said aperture in said front wall of said housing, said pull string being attached to said switch, said switch being turned on when said pull string is pulled, said pull string having a distal end with respect to said housing; and
   said assembly includes a ball being disposed on said pull string thereby facilitating the physically limited user to grip said ball, said ball being positioned adjacent to said distal end of said pull string.

7. The assembly according to claim 2, further comprising a light emitter being disposed on a front wall of said housing wherein said light emitter is configured to emit light outwardly from said front wall, said light emitter being electrically coupled to said control circuit, said light emitter being turned on when said control circuit receives said contact input or said emergency input.

8. An emergency communication assembly for contacting a pre-determined emergency contact when a pull string is engaged, said assembly comprising:
- a housing being positioned in a pre-determined area such that said housing is accessible to a physically limited user wherein said housing is configured to be accessible to the physically limited user in an emergency, said housing having a top wall and a front wall, said front wall having an aperture extending into an interior of said housing, said top wall having a plurality of speaker holes each extending into said interior of said housing;
- a communication unit being integrated into said housing, said communication unit being in wireless communication with an extrinsic communication network, said communication unit being programmed with a plurality of emergency contact phone numbers, said communication unit sequentially calling each of said emergency contact numbers when said communication unit is actuated until one of said emergency contact numbers answers wherein said communication unit is configured to facilitate the physically limited user to communicate with an individual when the physically limited user is experiencing an emergency, said communication unit comprising:
    - a control circuit being integrated into said housing, said control circuit receiving a contact input, said control circuit receiving an emergency input, said control circuit including an electronic memory, said electronic memory storing a database comprising said plurality of emergency contact numbers, said control circuit being electrically coupled to a power source comprising an electrical system of the pre-determined area in which said housing is positioned;
    - a switch being integrated into said housing, said switch being electrically coupled to said control circuit, said control circuit receiving said contact input when said switch is turned on;
    - a transceiver being integrated into said housing, said transceiver being electrically coupled to said control circuit, said transceiver being in wireless communication with the extrinsic communication network, said transceiver being turned on when said control circuit receives said contact input, said transceiver contacting sequentially contacting each of said emergency contacts in said database stored in said electronic memory until one of said emergency contacts answers when said control circuit receives said contact input, said transceiver contacting local emergency responders when said control circuit receives said emergency input, said transceiver being in wireless communication with a personal electronic device thereby facilitating said transceiver to receive phone numbers of said emergency contacts from the personal electronic device to download the phone numbers of said emergency contacts into said electronic memory;
    - a keypad being integrated into said top wall of said housing such that said keypad is accessible to the physically limited user, said keypad being electrically coupled to said control circuit, said keypad comprising a plurality of numeric keys thereby facilitating said plurality of numeric keys to program phone numbers of said emergency contacts into said electronic memory;
    - a speaker being integrated into said housing, said speaker being aligned with said plurality of speaker holes in said top wall of said housing wherein said speaker is configured to emit audible sounds outwardly through said speaker holes, said speaker being electrically coupled to said control circuit thereby facilitating said speaker to emit words spoken by said emergency contact that answers or the emergency responders wherein said speaker is configured to facilitate the physically limited user to hear words spoken by said emergency contact that answers or the emergency responders;
    - a microphone being integrated into said housing thereby facilitating said microphone to sense audible sounds, said microphone being electrically coupled to said control circuit thereby facilitating the physically limited user to speak with said emergency contact that answers or the emergency responder wherein said microphone is configured to facilitate the physically limited user to ask said emergency contact that answers or the emergency responders for assistance; and
    - an actuate button being movably integrated into said top wall of said housing, said actuate button being electrically coupled to said control circuit, said control circuit receiving said emergency contact when said actuate button is depressed, said actuate button having a top surface, said top surface having indicia being applied thereon, said indicia comprising the numbers "911";
- a pull string extending outwardly from said housing thereby facilitating said pull string to be accessible to the physically limited user, said pull string being operationally coupled to said communication unit, said communication unit being turned on when said pull string is pulled by the physically limited user, said pull string extending outwardly through said aperture in said front wall of said housing, said pull string being attached to said switch, said switch being turned on when said pull string is pulled, said pull string having a distal end with respect to said housing;
- a ball being disposed on said pull string thereby facilitating the physically limited user to grip said ball, said ball being positioned adjacent to said distal end of said pull string; and
- a light emitter being disposed on said front wall of said housing wherein said light emitter is configured to emit light outwardly from said front wall, said light emitter being electrically coupled to said control circuit, said light emitter being turned on when said control circuit receives said contact input or said emergency input.

* * * * *